(12) United States Patent
Johnson et al.

(10) Patent No.: US 11,128,597 B1
(45) Date of Patent: Sep. 21, 2021

(54) INFORMATION PASSING FOR CONTENT-BASED SOURCE SELECTION VIA DNS

(71) Applicant: Amazon Technologies, Inc., Seattle, WA (US)

(72) Inventors: Adam B. Johnson, Seattle, WA (US); Jorge Peixoto Vasquez, Mercer Island, WA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,814

(22) Filed: Mar. 31, 2020

(51) Int. Cl.
  *H04L 29/12* (2006.01)
  *H04L 29/08* (2006.01)
  *H04L 29/06* (2006.01)
  *H04L 9/06* (2006.01)

(52) U.S. Cl.
  CPC ........ *H04L 61/1511* (2013.01); *H04L 9/0643* (2013.01); *H04L 61/1552* (2013.01); *H04L 65/4084* (2013.01); *H04L 67/02* (2013.01); *H04L 67/1012* (2013.01); *H04L 67/2842* (2013.01); *H04L 69/22* (2013.01)

(58) Field of Classification Search
  USPC ....... 709/203, 221, 218, 201, 219, 242, 212, 709/200, 217
  See application file for complete search history.

(56) References Cited

U.S. PATENT DOCUMENTS

| | | | | |
|---|---|---|---|---|
| 10,616,179 | B1* | 4/2020 | McCarriar | H04L 61/2514 |
| 2010/0281178 | A1* | 11/2010 | Sullivan | H04N 21/2665 709/231 |
| 2016/0127260 | A1* | 5/2016 | Gordon | H04L 65/608 709/226 |
| 2016/0127440 | A1* | 5/2016 | Gordon | H04N 21/23439 709/219 |
| 2017/0272485 | A1* | 9/2017 | Gordon | H04L 65/601 |
| 2017/0353516 | A1* | 12/2017 | Gordon | H04L 67/10 |
| 2018/0176176 | A1* | 6/2018 | Kapur | H04L 67/10 |
| 2020/0186613 | A1* | 6/2020 | Johns | H04L 61/609 |

* cited by examiner

Primary Examiner — Jude Jean Gilles
(74) Attorney, Agent, or Firm — Nicholson DeVos Webster & Elliott LLP

(57) ABSTRACT

Techniques for information passing for content-based source selection via DNS are described. A domain name specified in a DNS lookup request includes one or more hostname and/or subdomain values that are generated based on obfuscating a path of the object that is ultimately to be sought by the client. The authoritative DNS server can identify the desired object, and select a particular network address for the lookup response in a more intelligent manner based on characteristics of the sought object, server location availabilities and characteristics, client device characteristics, etc.

20 Claims, 9 Drawing Sheets

INFORMATION PASSING FOR CONTENT-BASED SOURCE SELECTION VIA DNS

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (POP) of a content delivery system (or other organization) providing the content. Content delivery systems (sometimes referred to as "content delivery networks" or "CDNs") often attempt to connect users to a geographically "nearby" (to the user) POP, as such connections are commonly much faster than connections between the user and geographically-distant POPs or other computing systems. Accordingly, a CDN may implement POPs over a wide area—e.g., worldwide—and route requests for content to "nearby" POPs for fulfillment. For example, a CDN customer may host a set of files (often referred to as a "distribution") for a web page through the CDN. The CDN replicates ones or all of the set of files for the web page in potentially many locations, such as in a POP in Tokyo and another POP in London so that a user in the United Kingdom would be served the web page from the London POP while a user in Japan would be served the web page from the Tokyo POP.

Each POP may be associated with an address on a computing network, such as an Internet Protocol (IP) address. However, requests for content are generally addressed to a human-readable identifier, such as a universal resource identifier (URI) or domain name. To enable use of human-readable identifiers in accessing content, a client computing device can interact with a Domain Name System (DNS) that operates to resolve a domain name into a corresponding network address (e.g., an IP address). Typically, a CDN is associated with one or more domain names, and an operator of CDN will have authority to alter DNS records specifying IP addresses to which those domain names resolve. Thus, the operator of a CDN can utilize DNS records to control how requests to access content of the CDN are routed to POPs.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for content-based source selection via DNS. According to some embodiments, a DNS resolver can identify information provided by a client (such as the identity of a desired object sought by a client), through use of the standard DNS protocol, and select an optimal source to provide the object to the client based on this information. The DNS resolver may then return a network address, via the DNS protocol, to the client that is associated with the optimal source. The optimal source may be "close" to the client at a POP, in a more centralized location such as a region of a provider network or data center, or at another type of edge location of a provider network. The optimal source may vary for different objects (e.g., files or streams) of a same distribution, and may optionally vary at different times due to different conditions existing, such as the popularity of an object, network or resource availability conditions, and the like.

Accordingly, embodiments described herein can beneficially use the existing DNS protocol in a new and non-obvious manner to obtain information about a requesting client, such as that client's ultimately desired object(s), location, device characteristics, or network connectivity, and "route" these clients to particular sources based on any of a variety of factors or combination of factors. For example, embodiments employing techniques disclosed herein may flexibly and simply "react" to popular (or "hot") objects by dynamically placing them in locations "close" to users seeking the objects, and/or move away objects from potentially resource-constrained locations when they are no longer as popular. As another example, embodiments employing techniques disclosed herein may "partition" or shard a set of content-providing locations, such as POPs, so that certain objects, distributions, etc., are served from certain POPs. As yet another example, embodiments employing techniques disclosed herein may simply serve requests for content of a distribution from different locations, such as via serving comparatively small files (or objects needing low latency) from a first set or type of POPs while comparatively larger files (or objects that are comparatively less latency sensitive) from other comparatively client-distant locations such as more geographically distant POP or a region of a provider network. The foregoing aspects and many of the attendant advantages of the present disclosure will become more readily appreciated as the same become better understood by reference to the following, when taken in conjunction with the accompanying drawings.

Figure 1:
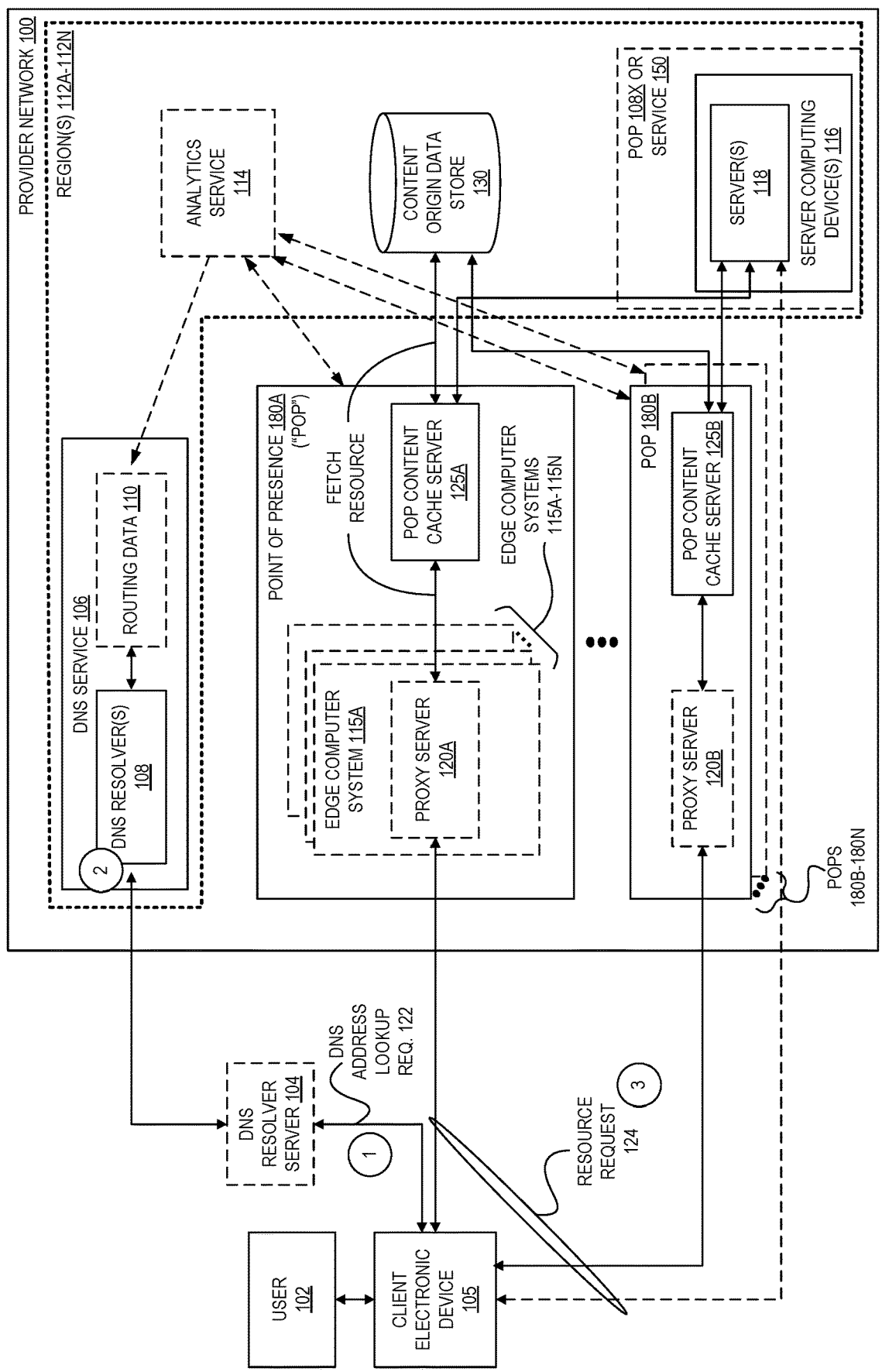
FIG. 1 is a diagram illustrating an environment for information passing for content-based source selection via DNS according to some embodiments.

FIG. 1 is a diagram illustrating an environment for information passing for content-based source selection via DNS according to some embodiments. In FIG. 1, a DNS resolver 108 is illustrated that implements content-based source selection via DNS to provide, via the DNS protocol, a network address of a source of content to a client selected based at least in part on an identifier of an object ultimately sought by the client that is provided in a DNS address lookup request. The DNS resolver 108 may be implemented using software executed by one or more computing devices, as computing hardware, or as a combination of both. In some embodiments, the DNS resolver 108 is implemented in a centralized manner, though in other embodiments the DNS resolver 108 is implemented in a distributed manner using multiple computing devices in one or multiple locations.

The DNS resolver 108 may be a part of a provider network 100 and implement aspects of a DNS service 106. The DNS service 106 may be, for example, a highly-available and scalable cloud DNS web service that gives developers and organizations a reliable way to route end users to Internet applications by translating domain names into the numeric network addresses that computing systems use to connect to each other. The DNS service 106 may be an authoritative DNS service that can operate to connect user requests to infrastructure running in the provider network 100, such as compute instances of a hardware virtualization service, virtual load balancers, object stores, etc., and may be used to route users to infrastructure outside of the provider network 100. The DNS service 106 may also implement DNS health checks to route traffic to healthy endpoints or to independently monitor the health of applications and its endpoints. A DNS service 106 may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions 112A-112N, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As shown, a provider network 100 includes one or more points of presence (POPs) 180A-180M to facilitate content distribution by caching content closer to end-users (e.g., the provider network 100 is operating a CDN). These POPs, which may be referred to as one type of "edge location" of the provider network 100, are typically geographically dispersed across cities, states, geographic areas, countries, etc. Customers of the provider network may host their content within the provider network, and the provider network can facilitate the distribution of that content to the customer's users through use of the POPs. Thus, a user's request for content may be routed to a proxy server within a POP that is geographically proximate to the source of the request, and the proxy server fulfills the request from content cached within the POP, if available. In some embodiments, multiple POPs may be in a same geographic area, e.g., scattered around a city, state, collection of cities, or geographic region, and thus several POPs may all be "near" a client.

POPs 180 thus represent geographically dispersed portions of the provider network 100, each capable of serving cached content to end-users. Such content can include, for example, the web site of a customer of the operator of the provider network 100, a set of audiovisual files, streamed content, etc. For example, Company A can host its website—www.companya.com—with the provider network 100. The website content, e.g., text, images, scripts, video, markup, or other data, may be stored in a content origin data store 130. In some embodiments, the content origin data store 130 is a volume (or "bucket" or "folder") of a storage service that provides data/storage resources (e.g., object storage, block-level storage, data archival storage, databases and database tables, etc.) using non-volatile storage media such as solid-state drives (SSDs). The content origin data store 130 may serve as the content source for caching by the POPs 180, though additionally or alternatively, one or more servers 118 (e.g., web servers, which here executed by one or more server computing devices 116, which may or may not be within the provider network 100) may also act as a content source. In some embodiments, the content origin data store 130 and/or server(s) 188 are located within one of the POPs 180, though in some embodiments the content origin data store 130 and/or server(s) 118 may be located in a "region" 112 of the provider network 100 (e.g., as a server implemented by a service 150 of the provider network 100 such as a compute instance run by a hardware virtualization service, a function run by a serverless on-demand code execution service, or the like) or within an entirely different network altogether. In some embodiments, the server(s) 118 may also be part of an "in-region" POP 108X, which may act as one POP in a larger set of POPs providing content to clients; this POP 108X may beneficially be larger in size due to comparatively fewer resource constraints, etc.

A user 102 may initiate a request for content hosted by (or otherwise made accessible by) the provider network 100 by, for example, commanding a web browser application executing on a client electronic device 105 to issue a HyperText Transfer Protocol (HTTP)-based request for a resource, utilizing another type of application that can fetch remote resources via HTTP, etc. Examples of such client electronic devices 105 include personal computers (PCs), cell phones, handheld messaging devices, laptop computers, set-top boxes, personal data assistants, electronic book readers, wearable electronic devices (e.g., glasses, wristbands, monitors), and the like.

As one simple example, the user 102 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc.

However, the client electronic device 105 may request a resource responsive to any associated user action, and thus may seek to request a resource on its own, e.g., due to its configuration, based on data it obtains from another source, etc. Thus, in some scenarios a client electronic device 105 could be another type of computing device, such as a server computing device, "smart" device or Internet of Things (IoT) device, etc.

To obtain the resource, the client electronic device 105 may issue a DNS address lookup request 122 at circle (1) that identifies the domain (www.example.com) to a DNS resolver server 104, which may be managed by the user's Internet Service Provider (ISP)—such as a cable Internet provider, a DSL broadband provider, or corporate network— or by another entity offering DNS lookup services.

Assuming the DNS resolver server 104 is unaware of the mapping between the provided domain name and a network address associated therewith (e.g., it does not have such a mapping entry in its cache), the DNS resolver server 104 may forward the request (to resolve www.example.com) to a non-illustrated DNS root name server, which may return identifiers of one or more name servers for the top level domain (TLD), and the DNS resolver server 104 may again forward the request to one of the non-illustrated TLD name servers for ".com" domains. The name server for ".com" domains may then respond to the request with the names/ network addresses of one or more name servers (e.g., DNS resolver 108) of the DNS service 106 that are associated with the requested "example.com" domain Thus, the DNS resolver server 104 chooses a name server (e.g., DNS resolver 108) and forwards the request for "www.example.com" to that name server.

Based on receipt of this forwarded request, the DNS resolver 108 may look in the "example.com" hosted zone for the "www.example.com" record at circle (2), obtain an associated value—such as the IP address for a web server (e.g., 192.0.2.44)—and return this IP address to the DNS resolver server 104.

In some cases, this resolution (or identification of an IP address for a domain) may be based on an estimate or approximation of the location of the client electronic device 105 (e.g., using an IP address of the client, when available, or an identifier of the DNS resolver server 104). Thus, the DNS resolver 108 can provide a network address of an entry point of a POP 180 that can offer the user the best performance (e.g., due to geographic proximity to the client electronic device 105). For example, POP 180A might be located in San Francisco, Calif., whereas POP 180B might be located in Chicago, Ill. Assuming the client electronic device 105 is estimated to be in Oakland, Calif. (or in Northern California, the Bay Area, etc.), the DNS resolver 108 may return a network address associated with POP 180A due to it being more geographically "close" to the inferred or determined location associated with the client. Knowledge of the location of the client can also allow for location compliance, e.g., certain clients in certain geographic locations may or may not be able to access a particular object.

Accordingly, for the purposes of the present disclosure, DNS resolution (e.g., the resolution of a domain name into a network address) may be domain-name independent. Thus, requests for any domain name associated with a content delivery system can be responded to with a network address of any POP of the content delivery system. This assumption holds, for example, where all POPs of a content delivery system operate to provide access to any content associated with the content delivery system. Thus, any POP can function to service requests for any content of the content delivery system. However, it is to be appreciated that embodiments described herein may optionally be deployed such that requests for certain domains may resolve to particular POPs (e.g., at certain points or ranges of time), which can beneficially enable cache sharding in that some or all objects of a distribution can be provided via a particular set of one or more POPs instead of being potentially duplicated in multiple POPs in a nearby geographic location. In this manner, in some embodiments objects of a single distribution may be sharded by causing certain objects of the distribution to be provided via a first POP (but not via a second POP) in an area while other objects of the same distribution are provided via the second POP (but not via the first POP). Similarly, in some embodiments, different distributions can be sharded across a set of POPs by, for example, causing objects belonging to a particular distribution to be provided via a first POP (or set of POPs) while objects of a different distribution are provided through a different POP (or different set of POPs).

The DNS resolver server 104 now finally has the IP address that the client needs and may return that value to the client electronic device 105. The DNS resolver server 104 may also cache (store) the IP address for "example.com" for some amount of time so that it can respond more quickly the next time a client needs to resolve "example.com."

The client electronic device 105 then may send a request 124 to obtain "www.example.com" at circle (3) to the network address (e.g., 192.0.2.44) that it obtained from the DNS resolver server 104, which may correspond to a POP 180A location, a server 118 (e.g., a compute instance), a storage server data store (e.g., content origin data store 130) configured as a website endpoint, etc. The web server or other computing resource at 192.0.2.44 may then return the requested resource (e.g., a web page for www.example.com) to the client electronic device 105, which may then act upon the resource (e.g., a web browser displays the page).

At a POP 180, a load balancer (not shown) may receive and then route the request to a proxy server 120A executed by one of a plurality of edge computer systems 115A-115N (e.g., electronic server devices) that facilitate content distribution from the POP. Upon receipt of the request (e.g., for Company A's web page), the proxy server 120A may obtain configuration data associated with the request. Note that since the proxy server 120A may be handling requests for many different customers of the provider network 100, there may be separate configuration data for each customer, for each resource, and/or for groups of resources. In some embodiments, the proxy server 120A fetches the configuration data from another service (not shown) or cache within the POP 180, or within a region 112 of the provider network 100. For example, the proxy server 120A in some embodiments sends a message to a database frontend with the URI of the request to retrieve the associated configuration data.

The obtained configuration data, in some embodiments, includes data used to locate the resource or content needed to fulfill the request from the client electronic device 105 (e.g., the location of the "index.html" resource within the provider network 100). Based on the configuration data, the proxy server 120A can request the resource from a POP content cache server 125A that is backed by the content origin data store 130 or server(s) 118. If the POP content cache server 125A already has the resource cached, it can return the resource to the proxy server 120. If not, the POP content cache server 125A can fetch the resource from the content origin data store 130 or server(S) 118 and, once obtained, return the resource to the proxy server 120A (and optionally also cache the resource at that time). In some embodiments, the POP content cache server 125A may return an indication of a resource miss to the proxy server 120A to either notify the proxy server 120A that the resource is being fetched from the content origin data store 130/ server(s) 118. Once the proxy server 120A has obtained the resource via the POP content cache server 125, the proxy server 120A returns the resource (e.g., via one or more HTTP response messages) to the client electronic device 105 to fulfill the request. Although FIG. 1 illustrates one variant of POP-based resource caching and request fulfillment, other CDN architectures are possible.

This process, however, is modified in some embodiments to allow the DNS resolver 108 to gain visibility—at the time of the DNS address resolution request—into what specific object the client ultimately is seeking. As a result of this knowledge, the DNS resolver 108 can make more intelligent resolution (or loosely speaking, "routing") decisions, e.g., by resolving requests where clients ultimately seek relatively small and/or static content to POPs (or other types of "edge locations") while potentially resolving requests (involving a same distribution or domain) where clients ultimately seek relatively larger and/or dynamic content to other locations (e.g., POPs that are more "distant" to the client but perhaps being less resource constrained).

Accordingly, due to knowledge of what objects (e.g., files, streams) are needed at the time of address resolution, embodiments can intelligently route clients to particular network sources well-suited for distributing the object—due to static differences between the sources (e.g., storage and/or bandwidth limitations) and/or dynamic/temporal differences, such as more efficiently accommodating "hot" objects under high-demand Beneficially, embodiments can be implemented without changes to the existing DNS protocol, and with minimal client-side code changes. For example, in some embodiments an analytics service 114 of the provider network 100 can monitor requests for various objects over time (e.g., via observing traffic into POPs 180, into regions 112, etc., via monitoring traffic logs) and can update routing data 110 (e.g., a mapping between an object identifier (such as a hash described herein) and a network address/POP/location) used by the DNS resolver 108 to direct clients to be resolved to particular locations based on these objects. In this manner, the analytics service 114 may be able to detect "hot" objects (and/or are of a threshold size) and cause the DNS resolver 108 to resolve clients to the POPs for these objects, and/or detect objects that are not hot (and/or are of a threshold size) and resolve clients seeking these objects to other sources, such as a more "remote" POP (e.g., POP 180B) or an in-region 112 server 118, which can ensure that the most overall requests are serviced via POPs or edge locations.

In some embodiments, segments of a cloud provider network—referred to herein as a provider substrate extension (or "PSE"), which may be an "edge location"—can be provisioned within a network that is independent from the cloud provider network. A cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

One example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

A further example of a provider substrate extension is a network deployed at a communications service provider location and may be referred to as a "wavelength zone." Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiberoptic, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

Thus, as used herein, the computing resources of the cloud provider network installed as provider substrate extensions are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. As described herein, embodiments can "route" clients to different types of locations, such as POPs, edge locations, in-region locations, etc.

Figure 2:
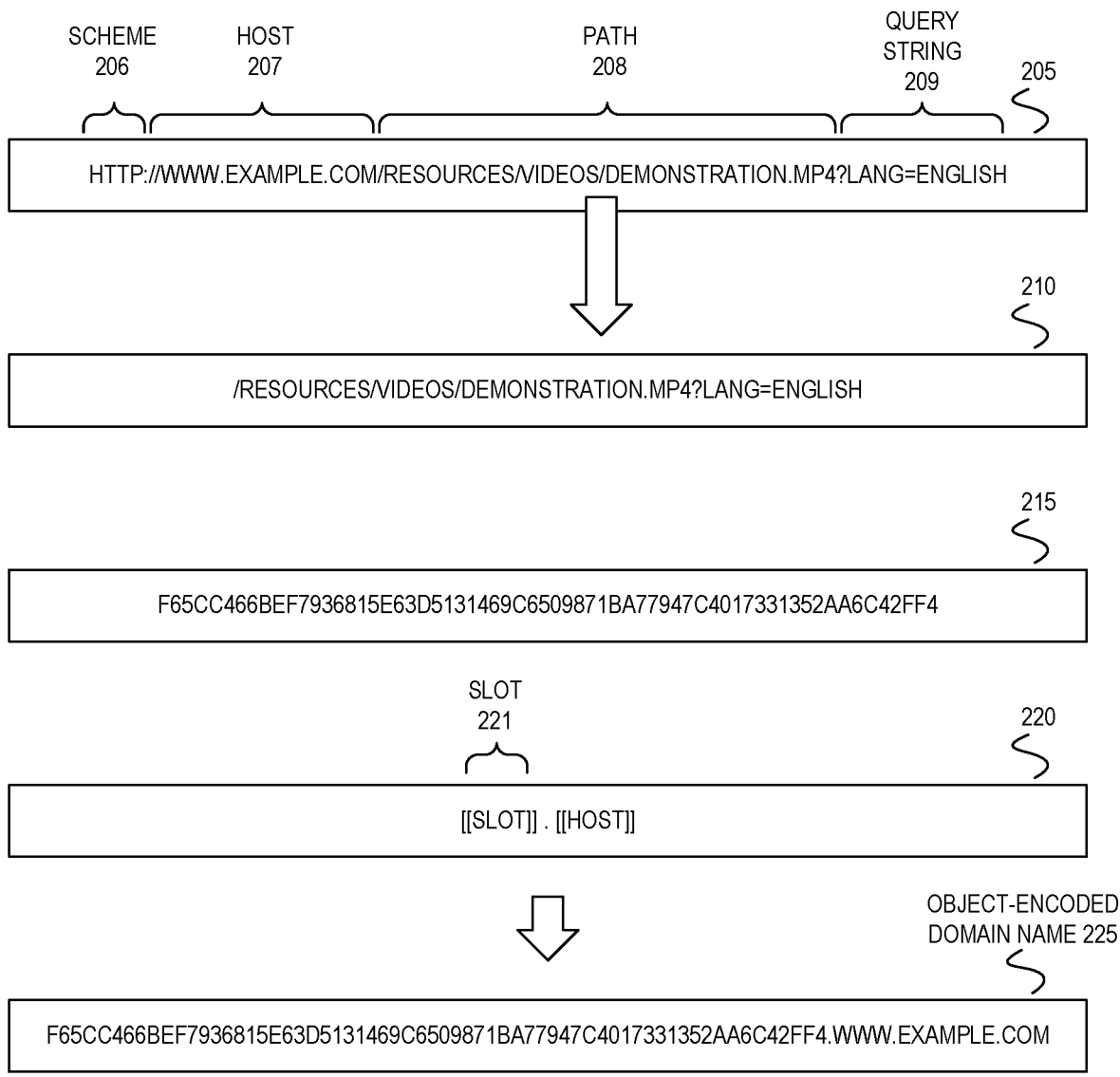
FIG. 2 is a diagram illustrating an exemplary object identifier encoding scheme for content-based source selection via DNS according to some embodiments.

For further detail, FIG. 2 is a diagram illustrating an exemplary object identifier encoding scheme for content-based source selection via DNS according to some embodiments. In FIG. 2, a URL 205 is depicted for an object resource that a client seeks—namely, a file by the name of "demonstration.mp4". As is known to those of skill in the art, a URL is often made up of three or four components: a scheme identifier 206, a host 207, a path 208, and/or a query string 209. The scheme identifies the protocol to be used to access the resource, which could be HTTP (without SSL) or HTTPS (with SSL). The host 207 name identifies a host that provides the resource. For example, "www.example.com". A server provides services in the name of the host, though hosts and servers do not have a one-to-one mapping. Host 207 names can also be followed by a port number. Well-known port numbers for a service are normally omitted from the URL. Most servers use the well-known port numbers for HTTP and HTTPS, so most HTTP URLs omit the port number. The path 208 identifies the specific resource of the host that the client wants to access. For example, "/resources/videos/demonstration.mp4". The query string 209, if used, follows the path component, and provides a string of information that the recipient can use for some purpose (for example, as parameters for a search or as data to be processed). The query string 209 usually follows a question mark and includes a string of one or more name and value pairs—for example, "lang=english" where "lang" is a name and "english" is the value. Name and value pairs may be separated from each other by an ampersand (&); for example, "lang=english&source=browser-search".

According to some embodiments, the path 208 can be used with the query string 209, combined as value 210, to generate a value 215 that can be included as a slot 221 of an object-encoded domain name 225 following encoding format 220.

For example, the value 210 may serve as a "cache key" from the perspective of the provider network in that it, for a particular distribution (that may be associated with the host 207) it uniquely identifies a particular object of the distribution. Thus, "/resources/VIDEOS/DEMONSTRATION.MP4?lang=english" may be a cache key for a first object (e.g., a video file with English audio) and the similar "/resources/VIDEOS/DEMONSTRATION.MP4?lang=spanish" may be a cache key for a second object (e.g., a video file with Spanish audio).

In some embodiments, this value 210 may be "obfuscated" and transformed into value 215. The obfuscation may include generating a "hash" of the value 210 (and optionally other information, as discussed below), e.g., via use of a hash algorithm such as a SHA hash (e.g., SHA-256), an MD5 hash, a RIPEMD hash, a WHIRLPOOL hash, a TIGER hash, or similar. In some embodiments, the value 210 (and optionally other information, as discussed below) may alternatively be encrypted (e.g., via a symmetric or asymmetric technique), or in other embodiments may be obfuscated or transformed according to another scheme allowing for the techniques described herein to be implemented; namely, that the DNS resolver 108 can identify the object based on it.

In some embodiments, this obfuscated value 215 can be used within a slot 221 of an object-encoded domain name 225 following encoding format 220. As illustrated the encoding format 220 may indicate that the obfuscated value 215 is to be combined (using a separating period) with the host 207 value.

The term "domain name" may generally refer to some or all of a fully qualified domain name (or "FQDN"). A device with the hostname "myhost" in the parent domain "example.com" has the fully qualified domain name of "myhost.example.com". The fully qualified domain name typically includes three or more labels: a top-level domain (or "TLD") such as ".com" or ".org", a domain name (e.g., "example"), zero or more optional subdomains (not illustrated herein, but see FIG. 4), and a host name (e.g., "www"). Commonly, and as used herein, the "host name" and any present subdomains may be generally all referred to as "subdomains" as is done in the art—e.g., "one.two.example.com" may be referred to as having two subdomains (or, more precisely a subdomain and a hostname) of "one" and "two".

A following example clarifies the structure of a fully qualified domain name "hosting.example.com.", which is [Host name] [Domain].[TLD].[Root]. In a name server's directory, the dot on the far right may be included in the FQDN. The root label after the dot remains empty. The TLD in the example is the TLD of ".com". Country-specific TLDs (e.g., ".ca" or ".co.uk") are also gathered under the abbreviation ccTLD for "country code top level domain" These are different than generic TLDs like ".com" or ".org", which are referred to as gTLD (for "generic top-level domain"). After the top-level domain comes the domain name, also called the "second level label" or "second level domain". In our example, this is "example". On the far left, we have the host name as the third level label: in our example, "hosting". Between the second level domain and the host name additional labels can be added for subdomains that refer to the sub areas of the domain and are called "third level domains", "fourth level domains", and so on. Their number is only limited by a maximum allowed total length for the FQDN, e.g., 255 characters.

In some embodiments, the obfuscated value 215 (or portions thereof, such as a first or last X number of characters, where X could be 14, 24, 32, 64, etc.)—which encodes the value 210 (with or without the query string, depending on the embodiment)—can be inserted as a slot 221 (e.g., as a label such as a hostname label slot or a subdomain label slot) of a domain name, e.g., along with the domain and TLD (collectively, the host 207) as shown in encoding format 220. This results in an object-encoded domain name 225, where the obfuscated value 215 is a label (corresponding to a hostname or subdomain) together with "example" as the host and ".com" as the TLD.

In this manner, an object-encoded domain name 225 can be generated by a client application, e.g., via use of a Software Development Kit (SDK) or similar plugin integrated into or used by the application, to enable the application to benefit from the object-aware routing of the DNS resolver 108. This occurs via the use of the existing DNS resolution approach described above, in which a DNS address lookup request is issued—albeit using this new object-encoded domain name 225. Beneficially, in some embodiments DNS systems involved (prior to the DNS resolver 108) do not need modification and can continue to perform DNS lookups using the existing protocol. However, when the lookup request is provided to the DNS resolver 108, the DNS resolver 108 may be able to now act differently.

In some embodiments, the DNS resolver 108 may use a data structure—e.g., routing data 110—that may allow the DNS resolver 108 to determine a network address to return based on the object-encoded domain name 225. For example, the DNS resolver 108 may first identify the domain (e.g., "example.com" or "www.example.com") from the request, which may serve to identify a distribution of objects. For this distribution, the routing data 110 may include one or more entries corresponding to potential obfuscated values 215 associated with one or more of these objects in the distribution. For example, an entity (e.g., an analytics service 114, or another component of the DNS service 106) may precompute obfuscated values associated with the objects in the distribution using the same obfuscation technique used by the client. This entity may populate the routing data 110 with an identifier (e.g., network address) associated with an object or obfuscated value 215. Thus, the DNS resolver 108 may be able to perform a lookup in the routing data 110 (e.g., using the obfuscated value 215 as a key into a table, map, hashmap, or the like) to identify one or more network addresses that could be used to resolve the request.

In some embodiments, such a data structure may not strictly include entries for each possible object in a distribution—instead, an entry may exist for "special" cases in which a particular object would best be served by a particular one or more source locations.

For example, in some embodiments the analytics service 114, based on metrics involving the objects such as their size, request count, request frequency, or the like, may identify objects having a threshold level of "popularity" and/or that have a threshold "size," and generate entries in the routing data only for these objects. In this manner, if a relatively large object (e.g., an audiovisual file, a binary file for an application, etc.) is being requested frequently (according to some threshold that may be flexibly implemented according to the desires of the implementor or customer), the analytics service 114 may detect this popularity, and cause the routing data 110 to be updated (e.g., to add/edit/remove an entry) to indicate that clients should be directed to some POP to access it, e.g., a specific POP or a POP closest to the client.

Similarly, in some embodiments, when the object no longer satisfies the popularity threshold, the analytics service 114 may update the routing data (e.g., to add/edit/remove an entry) so that requests involving the object (i.e., having the corresponding object-encoded domain name 225) may resolve to a different location, such as a less-resource constrained, but perhaps more latent, location (e.g., another POP, a location within a region 112 of the provider network 100, etc.).

The analytics service 114 may thus be flexibly configured to generate routing data in a variety of ways. For example, as indicated above, the analytics service 114 may cause clients to access a "closest" or "close" POP (e.g., furthest edge POPs that may be comparatively resource limited) for very popular objects but instead cause clients to access other POPs (or other network locations) that may be comparatively more distant—and possibly comparatively less resource constrained—for comparatively less popular objects. The analytics service 114 may additionally or alternatively apply a segmentation scheme in which requests for certain objects are resolved to specific POPs (e.g., a specific POP in each geographic region/area), which may eliminate certain objects from being served by certain POPs, freeing up cache space for other objects. Moreover, the analytics service 114 could resolve requests for particular objects to particular locations, e.g., a private or reserved location hosting objects for a particular customer of the provider network.

Thus, routing data 110 may or may not include entries for each object of a distribution, and may or may not include data structures specifying a specific set of candidate network addresses for use (e.g., a set of POPs) or non-use, or locations for use or non-use.

In some embodiments, when a set of network addresses or locations is identified for a particular object, the DNS resolver 108 may apply a selection technique to choose one address to be returned. In some cases, this may be performed according to a consistent scheme—e.g., consistent hashing—so that requests for a same object may always resolve to a same single location/address. In this manner, the system can "shard" or "partition" objects to particular POPs, for example, eliminating the need to store and serve objects of a same distribution (or even the same object) across multiple POPs in some geographic area. This can effectively increase the overall capacity of these POPs, as a same object or set of objects do not need to be in all places (e.g., a set of POPs in a same city, for example). However, other schemes can also be used, such as round-robin, random, weighted round robin, least "busy"/loaded location, etc.

Additionally, or alternatively, in some embodiments the DNS resolver 108 may perform de-obfuscation of the obfuscated value 215 for a request. For example, upon receipt of a DNS address lookup request with an object-encoded domain name 225, the DNS resolver 108 may identify the domain or host (e.g., "example.com" or the value "www.example.com") and fetch properties for the associated distribution (e.g., to determine whether DNS requests for the distribution are to be routed using these object-aware techniques, and/or to determine other constraints or policies in effect that may define or limit potential locations that could be returned). The DNS resolver 108 may then, e.g., lookup pre-computed hashes for the distribution, and/or generate hashes for objects identified in the distribution. The DNS resolver 108 may then identify the requested object (or type of object, such as whether it is a large file, a popular file, etc.), and use this value to identify possible locations (having associated network addresses) that may be returned for the object. The DNS resolver 108 may select one of these addresses according to a selection scheme as introduced above, which is then returned toward the client (e.g., to a recursive DNS server, etc.).

Figure 3:
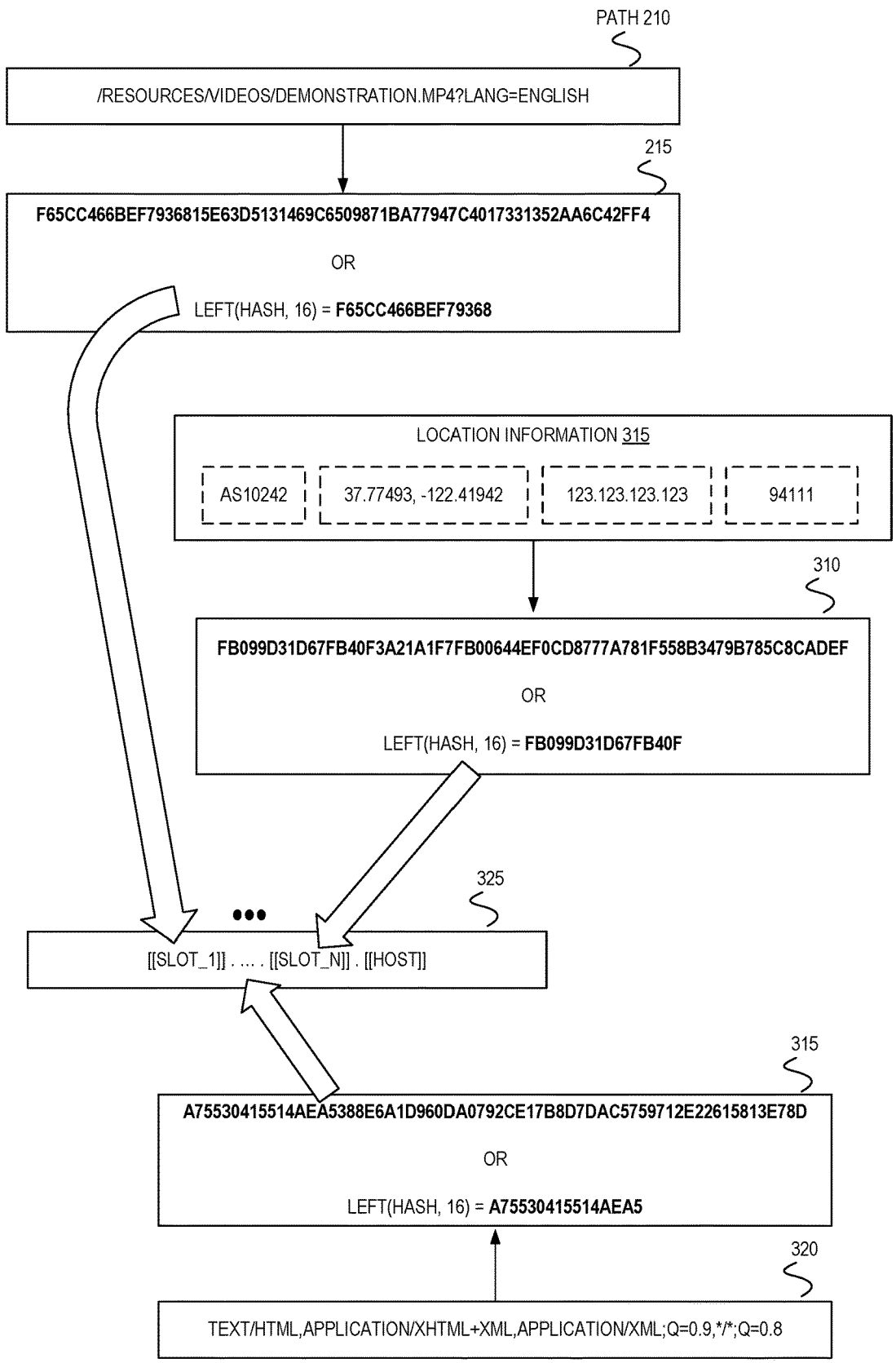
FIG. 3 is a diagram illustrating an exemplary multipart encoding scheme for content-based source selection via DNS according to some embodiments.

As indicated, in some embodiments the value 210 may be combined with other data to generate the obfuscated value 215, or to generate multiple obfuscated values, which can be used in the object-encoded domain name 225. For example, FIG. 3 is a diagram illustrating an exemplary multipart encoding scheme for content-based source selection via DNS according to some embodiments. In various embodiments, multiple different pieces of information can be provided from a client to the DNS resolver 108 using a single slot (e.g., subdomain) or, in some cases, multiple slots. For example, in FIG. 3 the value 210 may be obfuscated (e.g., hashed, encrypted, or otherwise transformed) into the value 215, which could be used in full (e.g., sixty-four characters in length) or in part (e.g., a leftmost or rightmost number of characters, such as four, eight, sixteen, thirty-two, etc.) as a slot/label (e.g., depicted as "SLOT_1") in the multipart encoding format 325. This is similar to the construction presented in FIG. 2. However, in FIG. 3, additional items of information may be obfuscated and passed, such as location information 315 associated with the client. The location information 315 may comprise a data element associated with a physical location of the client, a network location of the client, etc., and may comprise an autonomous system number (ASN) identifier (e.g., "AS10242"), a latitude and/or longitude of the client, a network address utilized by the client, a ZIP code associated with the client or end-user, etc. Such location information 315 can also be obfuscated, e.g., via computing a hash thereupon, to result in a value 310 that can be used as another slot (e.g., SLOT_2, not shown) in the multipart encoding format 325. This location information can also be used as part of the source network address selection process by the DNS resolver 108, e.g., to identify one or more POPs that may be "closest" to the client device. Such location information in many cases is not available to a DNS resolver, as this type of information from the client may have been "hidden" due to the involvement of intermediate (e.g., recursive) DNS servers. Thus, instead of attempting to guess a location of the client (e.g., via basing the location-related decisions on the identity of a recursive DNS server, which may or may not be in a similar location as the client), the DNS resolver 108 can more directly and easily get precise information to base its routing decisions upon, leading to better resolutions to closer, lower-latency data sources for clients.

Additionally, or alternatively, the clients may provide other types of information, such as cookies, customer-specified logic, and/or HTTP header type information such as data 320, which reflects a set of HTTP "accept" header values. The "accept" HTTP header advertises which content types, expressed as MIME types, the client is able to understand. Using content negotiation, a server typically selects one of the proposals, uses it, and informs the client of its choice with the Content-Type response header. Browsers set adequate values for this header depending on the context where the request is done; when fetching a CSS stylesheet, a different value is set for the request than when fetching an image, video, or a script. Such data can allow the DNS resolver 108 to identify additional characteristics of the client device and/or data, enabling for more intelligent selection of a source.

Moreover, in some embodiments the encoding format 325 includes one or more bits/characters providing a consistency value that the DNS resolver 108 can evaluate to determine whether the request was generated by a valid client. For example, a legitimate client may be given a token/key or an SDK (reliant on such a secret) that may hash/encrypt a value according to a known scheme, and thus the DNS resolver 108 may determine if this value is proper before further evaluating or resolving an address. This allows the DNS resolver 108 to "filter" out attackers or non-legitimate users before they are ever able to make a request to a data source, adding an additional layer of protection for the system as a whole.

As discussed, in some embodiments a client generates the encoded data—e.g., the value 215, value 310, value 315, object-encoded domain name 225, and the like—using a software process (e.g., a function or library) or hardware process, and a DNS resolver 108 of the provider network 100 uses this select a server to resolve the client to. It is to be appreciated that other configurations may also be utilized without departing from the scope and spirit of this disclosure. For example, routing data 110 (e.g., from the analytics service 114) may be provided to the client to allow it to determine if/when to perform a resolution using a generated encoded value for a particular object. In some embodiments, the client may seek to obtain multiple objects (e.g., multiple files referenced within a web page) and determine if any of these objects are represented in a set of "hot objects" through use of the provided routing data; if so, the client may resolve a location for obtaining these objects using encoding techniques disclosed herein and may use a standard location (e.g., via regular DNS resolution, or a cache of network addresses) for the other objects, resulting in reducing the need to perform "custom" resolution of these encoded values to only scenarios in which a significant benefit can be obtained and/or allowing for additional use of network address caching.

Additionally, or alternatively, a DNS resolver 108 may also be deployed outside of the provider network 100—e.g., within an ISP network, within a client network, as a software module executed by the client electronic device, etc. In these cases, the resolver may be provided routing data, reachability data (e.g., identifiers of POPs), and the like, similar to that used by the in-provider network 100 DNS resolver 108. Such configurations can, among other benefits, reduce resolution time, allow for "filtering" of DNS resolution requests before passing them on to another resolver performing standard DNS resolution, allow for additional address caching, etc.

Figure 4:
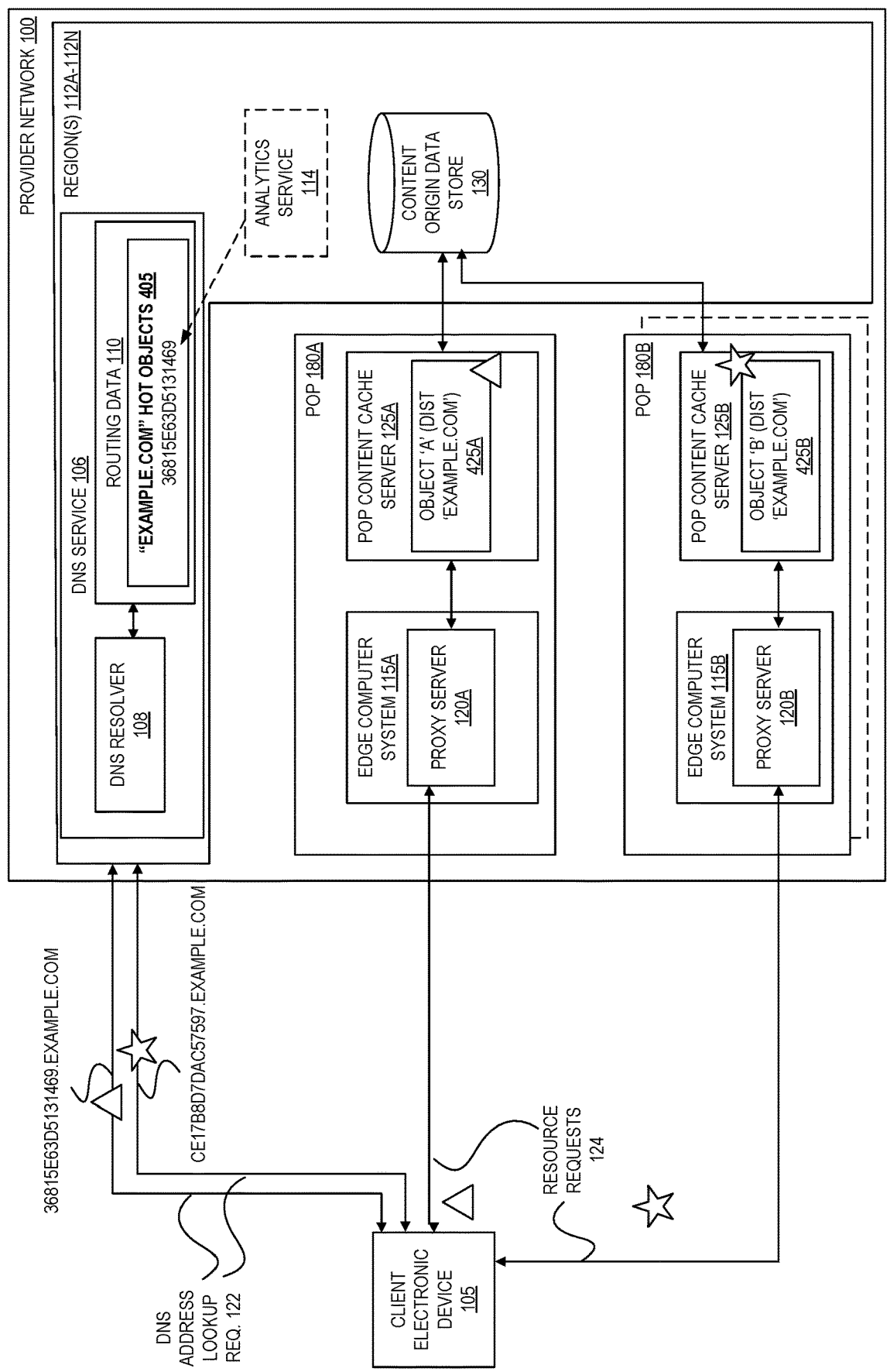
FIG. 4 is a diagram illustrating differentiated distribution routing via information passing for content-based source selection via DNS according to some embodiments.

Using ones of these techniques, embodiments can effectively distribute requests for content in more intelligent and efficient ways, reducing latency for end users, ensuring availability, and the like. For example, FIG. 4 is a diagram illustrating differentiated distribution routing via information passing for content-based source selection via DNS according to some embodiments. As illustrated, a client electronic device 105 may issue two different DNS address lookup requests for different objects (e.g., files) of a same distribution (associated with "example.com") using two different object-encoded domain names—here, an object 'A' 425A and an object 'B' 425B of an "example.com" distribution. In this case, each resolution may be handled differently by the DNS resolver 108, e.g., due to one of these associated objects being determined to be sufficiently "hot" (per the set 405 of hot objects for the distribution of "example.com" reflected by routing data 110) and/or of a threshold size (corresponding to the "triangle" request 122) and thus steered toward a POP 180A, while another object (corresponding to the "star" request 122) does not have an entry in the set 405 of hot objects, and may instead be steered toward another location, such as another POP, a more distant POP, a more distant (and less resource constrained) server in a region, etc.

Figure 5:
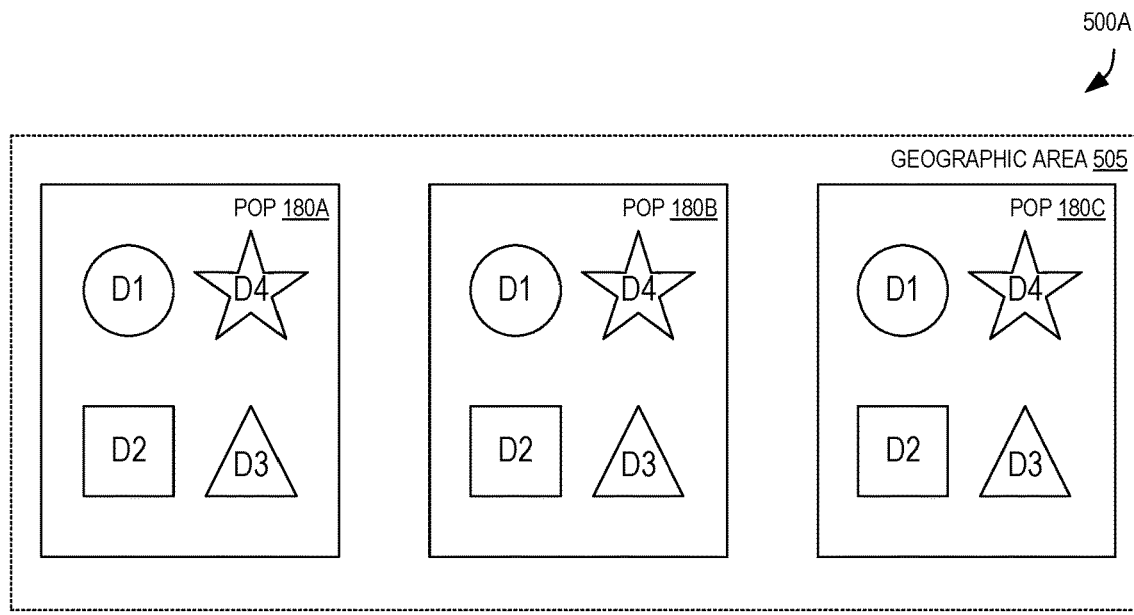
FIG. 5 is a diagram illustrating distribution-level sharding via information passing for content-based source selection via DNS according to some embodiments.
Figure 5:
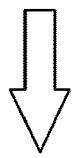
Figure 5:
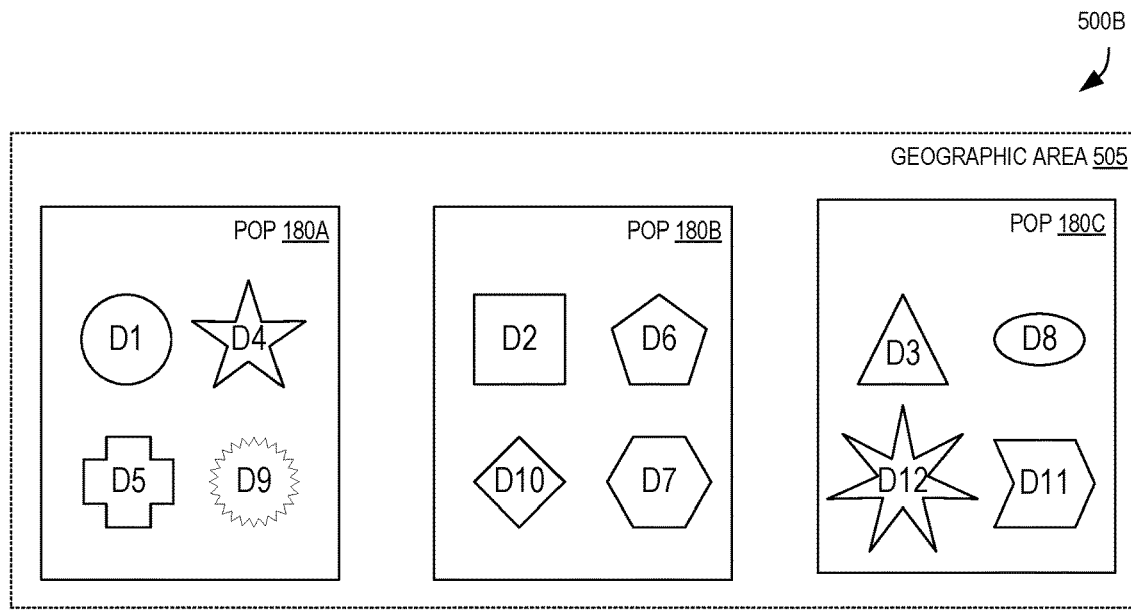

Embodiments can also improve the capacity of a set of POPs 180A-180C by eliminating certain cache redundancy. FIG. 5 is a diagram illustrating distribution-level sharding via information passing for content-based source selection via DNS according to some embodiments. According to previous techniques, a CDN may have multiple POPs 180A-180C in a particular geographic area 505 (e.g., city, state, area, country, etc.), and clients issuing requests for content of a distribution may arrive at any one of these POPs 180A-180C. As a result, objects of a distribution may be cached at multiple POPs. As shown, it could be the case that due to traffic loads and dispersion patterns, objects from four distributions D1-D4 may occupy the cache space available at these POPs.

In contrast, according to embodiments disclosed herein, the DNS resolver 108 may optionally be configured to "steer" requests involving a same distribution—or a same file/object—to a same POP. As a result, this same data is not duplicated among multiple POPs. Thus, additional capacity is freed for use to cache other objects/files—here shown as D1-D12—and thus the system can provide additional capacity for handling more files/distributions, even using the same underlying hardware resources.

Figure 6:
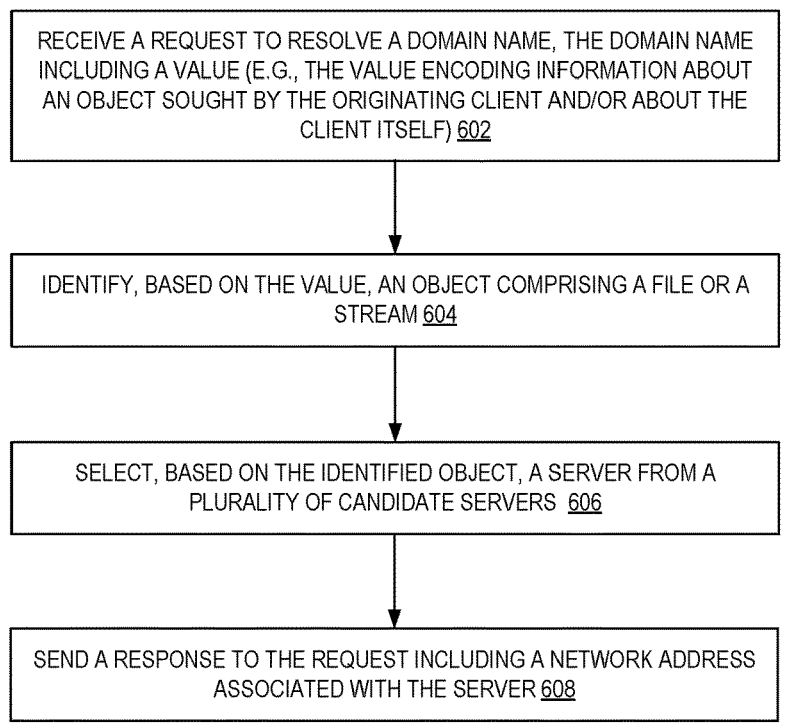
FIG. 6 is a flow diagram illustrating operations of a method for information passing for content-based source selection via DNS according to some embodiments.

For further detail, FIG. 6 is a flow diagram illustrating operations 600 of a method for information passing for content-based source selection via DNS according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the DNS resolver 108 of the other figures.

The operations 600 include, at block 602, receiving a request to resolve a domain name, the domain name including a value. The value may, for example, encode information about an object (e.g., a file or stream) or a client that seeks to access the object.

In some embodiments, the value was generated based on obfuscating data associated with the object or the client and may include, as an example, at least a portion of a Uniform Resource Locator (URL) associated with the object. In some embodiments, the data comprises the path of the URL. In some embodiments, the data further comprises at least one of: a query string, or one or more HyperText Transfer Protocol (HTTP) header values. In some embodiments, obfuscating the data comprises generating a one-way hash of the data using a hash algorithm or encrypting the data using an encryption key. In some embodiments, the data includes at least one data element comprising at least one of: location information associated with a client; device characteristics associated with a device that implements the client; or network connectivity information associated with the device; and the selecting of the server is based at least in part on the at least one data element.

The operations 600 further include, at block 604, identifying, based on the value, an object comprising a file or a stream. Block 604 may include performing a lookup in a data structure using the value, or generating a plurality of encoded values (e.g., for objects of a distribution) and determining whether any of these encoded values matches the value.

The operations 600 further include, at block 606, selecting, based on the identified object, a server from a plurality of candidate servers. Block 606 may be based at least in part on a location of the client, locations of the candidate servers, an actual or predicted location of the object within a cache/POP location, etc.

In some embodiments, the plurality of candidate servers includes at least one server within a first edge location (e.g., POP) and another server within another edge location (e.g., POP), though in some embodiments the plurality of candidate servers includes at least one server deployed within a region of a multi-tenant cloud provider network. In some embodiments, selecting the server from a plurality of candidate servers comprises: determining that the object currently satisfies a popularity threshold; and selecting the server based at least in part due to it being within an edge location and based at least in part on a location of a client. In some embodiments, selecting the server from a plurality of candidate servers comprises determining that the object currently does not satisfy a popularity threshold; and selecting the server based at least in part due to it being located within the region of the multi-tenant provider network.

The operations 600 further include, at block 608, sending a response to the request including a network address associated with the server. The response may be transmitted to another DNS resolver acting as a recursive DNS resolver, for example.

In some embodiments, the operations 600 further include identifying, based on a domain and a top-level domain provided in the request, a content delivery network (CDN) distribution; and identifying, based at least in part on the CDN distribution, the plurality of candidate servers.

In some embodiments, the operations 600 further include receiving, at the DNS resolver, one or more entries of a data structure corresponding to one or more objects, wherein the one or more entries map the one or more objects to one or more servers or locations, wherein selecting the server is based on performing a lookup using the data structure to identify the server or a location of the server.

Figure 7:
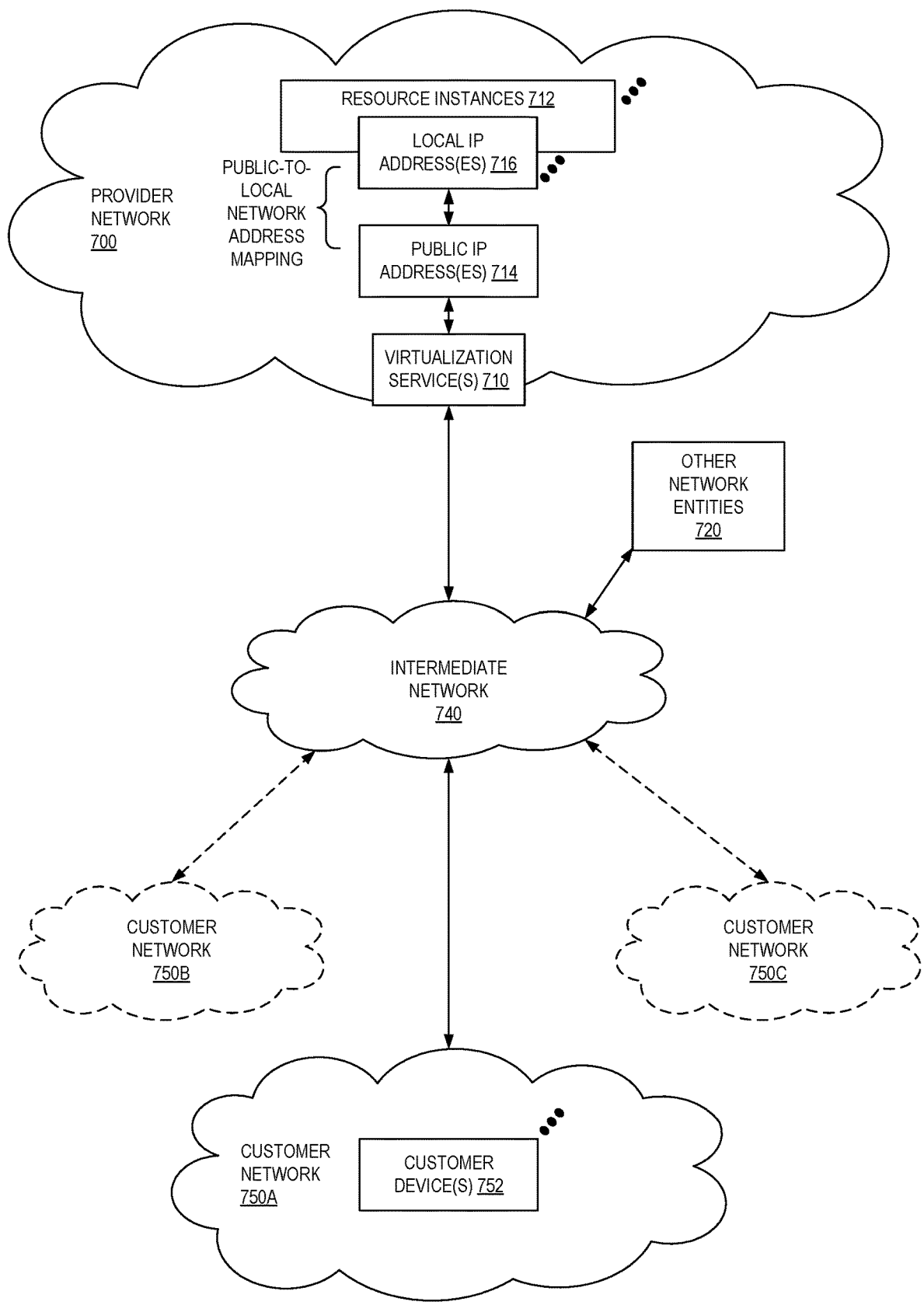
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
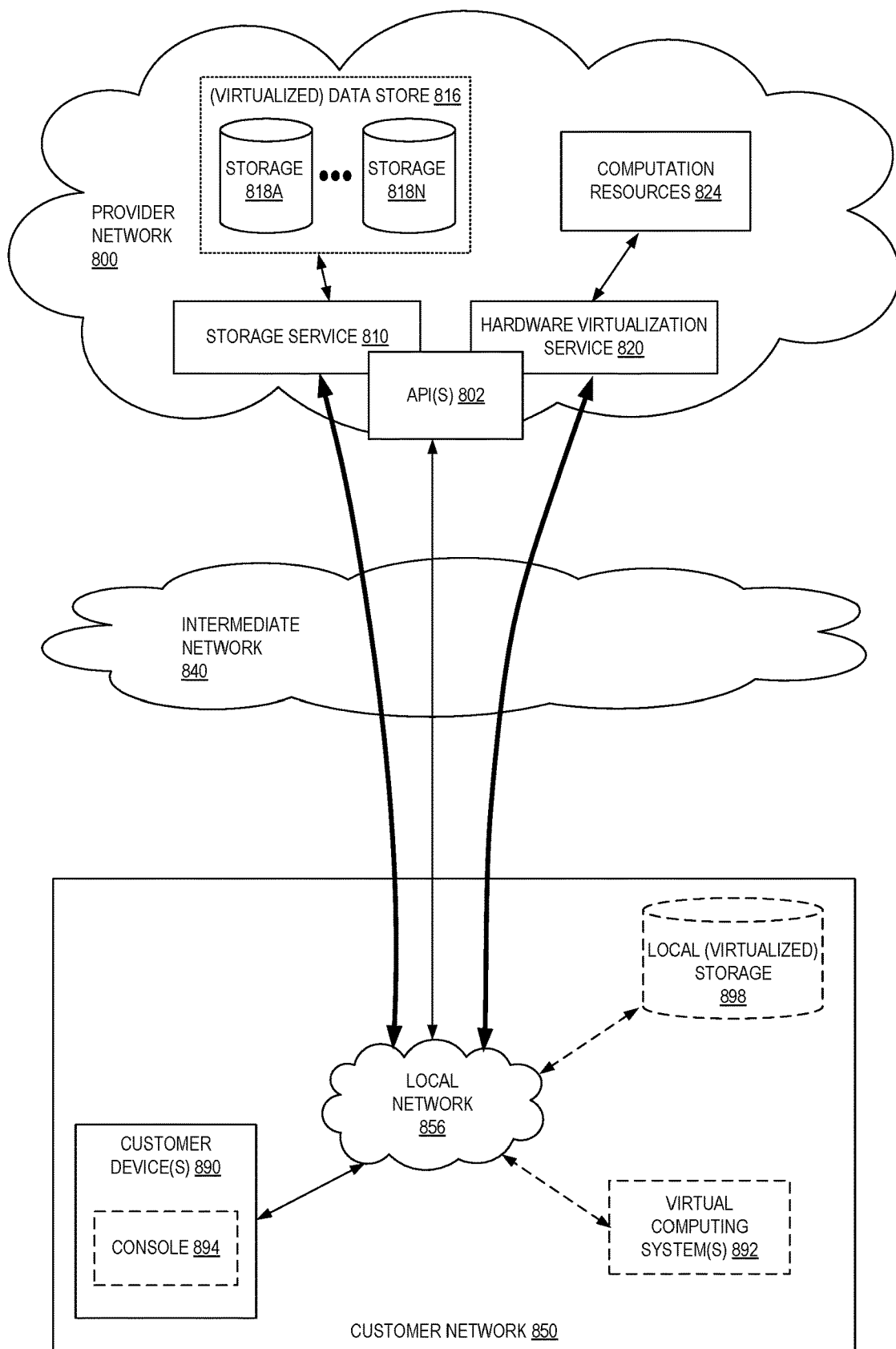
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
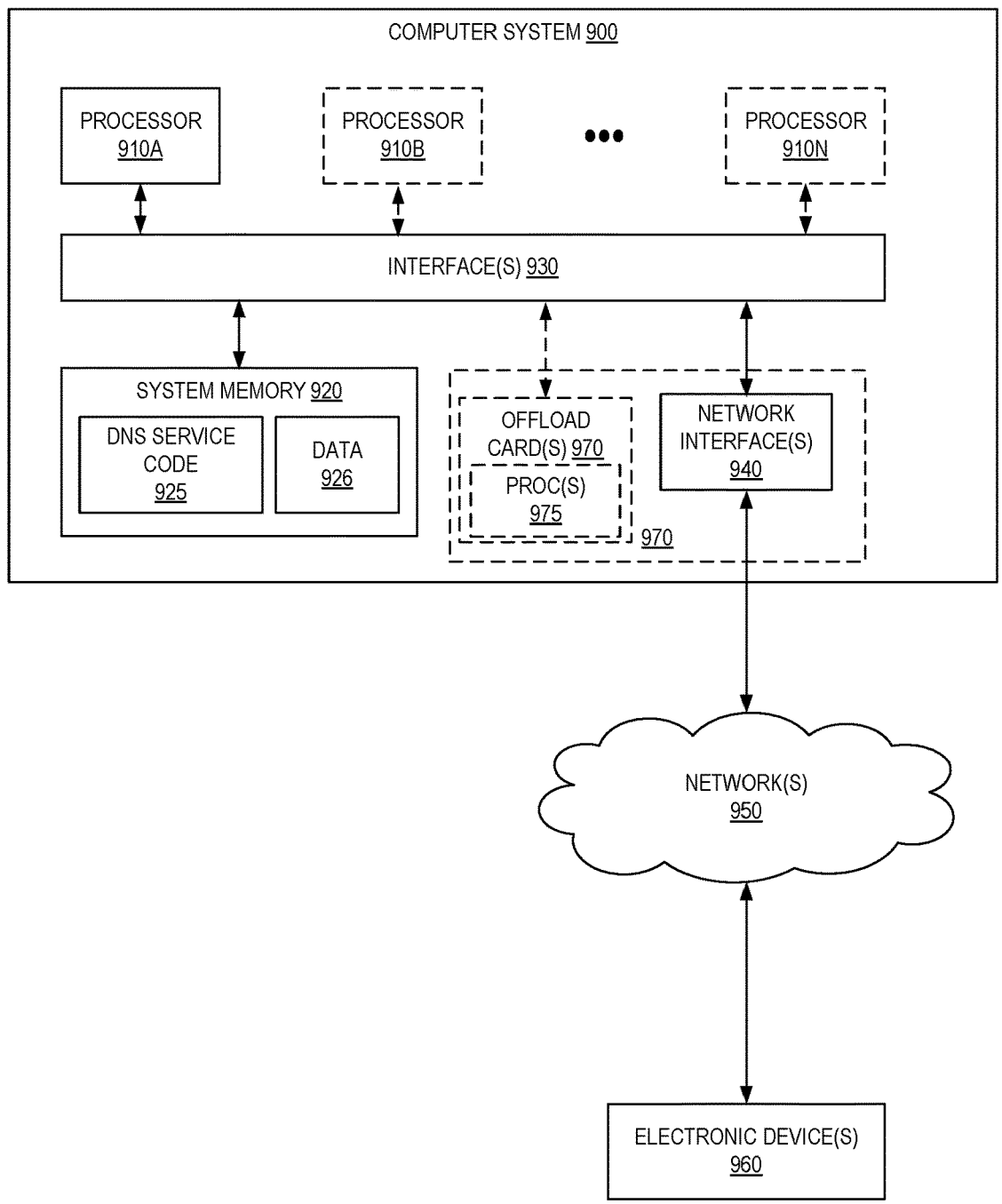
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as DNS service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving, at a Domain Name Service (DNS) resolver of a multi-tenant provider network, a DNS address lookup request to resolve a domain name, the domain name including a value, the value comprising a hostname or a subdomain;
  determining, by the DNS resolver, that the value matches a hash value associated with a file of a content delivery network (CDN) distribution;
  selecting, by the DNS resolver based at least in part on one or more characteristics of the file, a first server from a plurality of candidate servers, the one or more characteristics of the file including at least either a size of the file or a recent popularity of the file; and
  sending, by the DNS resolver, a DNS address lookup response including a network address associated with the first server.

2. The computer-implemented method of claim 1, further comprising:
  receiving, at the first server, a HyperText Transfer Protocol (HTTP) request to get the file, the HTTP request including the value within a header;

determining, by the first server, that the value matches the hash value associated with the file; and transmitting, by the first server, the file.

3. The computer-implemented method of claim 1, wherein the selecting of the first server is further based on a location information value associated with a client seeking to access the file, wherein the location information value is obtained from the DNS address lookup request.

4. A computer-implemented method comprising:
receiving, at a Domain Name Service (DNS) resolver, a request to resolve a domain name, the domain name including a value;
identifying, by the DNS resolver based on the value, an object comprising a file or a stream;
selecting, by the DNS resolver based on the identified object, a server from a plurality of candidate servers; and
sending, by the DNS resolver, a response to the request including a network address associated with the server.

5. The computer-implemented method of claim 4, wherein the value was generated based on obfuscating data comprising at least a portion of a Uniform Resource Locator (URL) associated with the object.

6. The computer-implemented method of claim 5, wherein the data comprises at least one of: the path of the URL, a query string, or one or more HyperText Transfer Protocol (HTTP) header values.

7. The computer-implemented method of claim 4, wherein the value encodes information about the object or a client that seeks the object.

8. The computer-implemented method of claim 5, wherein obfuscating the data comprises generating a one-way hash of the data using a hash algorithm or encrypting the data using an encryption key.

9. The computer-implemented method of claim 7, wherein:
the encoded information includes at least one data element comprising:
a location information associated with the client;
a device characteristic associated with a device that implements the client; or
a network connectivity information associated with the device; and
the selecting of the server is based at least in part on the at least one data element.

10. The computer-implemented method of claim 4, further comprising:
identifying, based on the request, a content delivery network (CDN) distribution; and
identifying, based at least in part on the CDN distribution, the plurality of candidate servers.

11. The computer-implemented method of claim 10, wherein the plurality of candidate servers includes at least one server within a first Point of Presence (POP) location and at least one server deployed within a second POP location.

12. The computer-implemented method of claim 11, wherein selecting the server from a plurality of candidate servers comprises:
determining that the object currently satisfies a popularity threshold; and
selecting the server based at least in part due to a location of a client.

13. The computer-implemented method of claim 11, wherein selecting the server from a plurality of candidate servers comprises:
determining that the object currently does not satisfy a popularity threshold; and
selecting the server based at least in part due to determining that the server is most likely, among the plurality of candidate servers, to have the object available in a cache of the first POP location.

14. The computer-implemented method of claim 4, further comprising:
receiving, at the DNS resolver, one or more entries of a data structure corresponding to one or more objects, wherein the one or more entries map the one or more objects to one or more servers or locations,
wherein selecting the server is based on performing a lookup using the data structure to identify the server or a location of the server.

15. A system comprising:
a first one or more electronic devices to implement a first one or more caching servers at a first point of presence (POP) location;
a second one or more electronic devices to implement a second one or more caching servers at a second POP location;
a third one or more electronic devices to implement a Domain Name Service (DNS) resolver, the DNS resolver including instructions that upon execution cause the DNS resolver to:
receive a request to resolve a domain name, the domain name including a value;
identify, based on the value, an object comprising a file or a stream;
select, by the DNS resolver based on the object, a server from a plurality of candidate servers, the plurality of candidate servers including at least one of the first one or more caching servers and at least one of the second one or more caching servers; and
send a response to the request including a network address associated with the server.

16. The system of claim 15, wherein the value was generated based on an obfuscation of data comprising at least a portion of a Uniform Resource Locator (URL) associated with the object.

17. The system of claim 16, wherein the data comprises the path of the URL.

18. The system of claim 17, wherein the data further comprises at least one of: a query string, or one or more HyperText Transfer Protocol (HTTP) header values.

19. The system of claim 16, wherein the obfuscation of the data comprises generating a one-way hash of the data using a hash algorithm or encrypting the data using an encryption key.

20. The system of claim 15, wherein the instructions upon execution further cause the DNS resolver to:
identify, based on the request, a content delivery network (CDN) distribution; and
identify, based at least in part on the CDN distribution, the plurality of candidate servers.

\* \* \* \* \*